(12) United States Patent
Jenkner et al.

(10) Patent No.: US 6,430,245 B1
(45) Date of Patent: Aug. 6, 2002

(54) METHOD FOR TRANSMITTING DIGITAL DATA OVER A CAPACITIVE INTERFACE WITH DATA INTEGRITY

(75) Inventors: Christian Jenkner, Velden; Michael Staber, Villach, both of (AT)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/240,717

(22) Filed: Jan. 29, 1999

(51) Int. Cl.[7] .......................... H04L 23/00; H04L 5/16; H04L 7/00
(52) U.S. Cl. .................... 375/377; 375/222; 375/358
(58) Field of Search ................... 375/377, 219, 375/220, 222, 224, 227, 354, 358, 359; 379/93.1

(56) References Cited

U.S. PATENT DOCUMENTS 6,163,570 A * 12/2000 Olafsson ..................... 375/223
6,275,581 B1 * 8/2001 Fischer et al. ............... 379/389
6,289,070 B1 * 9/2001 Krone et al. ................. 375/377

* cited by examiner

*Primary Examiner*—Chi Pham
*Assistant Examiner*—Khai Tran
(74) *Attorney, Agent, or Firm*—Laurence A. Greenberg; Werner H. Stemer; Gregory L. Mayback

(57) ABSTRACT

A method of using a capacitively coupled interface to increase the integrity of digital signals being transmitted across the interface includes transmitting signals between a first electronic circuit and a second electronic circuit using a capacitively coupled interface, and protecting the integrity of the signals by using a protocol. The protocol preferably includes: Transmitting a signal from the first electronic circuit to the second electronic circuit on the capacitively coupled interface. After the second electronic circuit receives the signal from the first electronic circuit, transmitting a unique synchronization sequence from the second electronic circuit to the first electronic circuit on the capacitively coupled interface. Constructing a status signal that contains information concerning a status of the first electronic circuit. After the first electronic circuit receives the unique synchronization sequence, transmitting the status signal and a data signal from the first electronic circuit for reception by the second electronic circuit on the capacitively coupled interface. Determining if the received status signal corresponds to a predetermined status signal, and if the received status signal corresponds to the predetermined status signal, determining that the received data signal is valid.

3 Claims, 2 Drawing Sheets

| 1 | 1 | 0 | Data(x) |

FIG. 3 (30)

| 0 | ctrl | 0 | Data(n) | 0 | ctrlq | 0 | Data(n+1) |

FIG. 4 (40)

| ctrl | Data(x) | Data(x+1) | ctrlq |

FIG. 5 (50)

METHOD FOR TRANSMITTING DIGITAL DATA OVER A CAPACITIVE INTERFACE WITH DATA INTEGRITY

BACKGROUND OF THE INVENTION

Field of the Invention

The present invention relates to a method for electrically isolating two circuits from one another while transmitting data between the two circuits. Well known methods include using a transformer, an optical isolator, or a capacitor connected in series on the data line between the two circuits, which will also be referred to herein as a capacitively coupled interface. One disadvantage with using transformers and optical isolators is that they are much more expensive than capacitors. A capacitively coupled interface has successfully been used to transmit analog data between two circuits, however the capacitor decreases the quality of the signal. Digital data in the form of fixed voltage levels can be transmitted over a capacitively coupled interface, however the integrity of the data can be compromised if certain precautions are not taken.

SUMMARY OF THE INVENTION

It is accordingly an object of the invention to provide a method of using a capacitively coupled interface to transmit digital data between two electrically isolated circuits wherein the method includes steps for protecting the integrity of the digital data.

It is accordingly an added object of the invention to provide a method of using a capacitively coupled interface to increase the integrity of digital signals transmitted across the interface, which comprises: transmitting signals between a first electronic circuit and a second electronic circuit using a capacitively coupled interface; and protecting the integrity of the signals by using a protocol.

In accordance with an additional feature of the invention, the method includes transmitting a signal from a first electronic circuit to a second electronic circuit on a capacitively coupled interface; after the second electronic circuit receives the signal from the first electronic circuit, transmitting a unique synchronization sequence from the second electronic circuit to the first electronic circuit on the capacitively coupled interface; constructing a status signal that contains information concerning a status of the first electronic circuit; after the first electronic circuit receives the unique synchronization sequence, transmitting the status signal and a data signal from the first electronic circuit for reception by the second electronic circuit on the capacitively coupled interface; determining if the received status signal corresponds to a predetermined status signal; and if the received status signal corresponds to the predetermined status signal, determining that the received data signal is valid.

In accordance with an another feature of the invention, the method includes: after the second electronic circuit receives the signal from the first electronic circuit and before performing the step of transmitting a unique synchronization sequence from the second electronic circuit to the first electronic circuit on the capacitively coupled interface, sending a clock signal from the second electronic circuit to the first electronic circuit on the capacitive interface.

In accordance with a further feature of the invention, the method includes performing the step of transmitting the signal from the first electronic circuit to the second electronic circuit on a first capacitively coupled channel; and performing the step of transmitting the unique synchronization sequence from the second electronic circuit to the first electronic circuit on a second capacitively coupled channel.

In accordance with an added further feature of the invention, the method includes: after the second electronic circuit receives the signal from the first electronic circuit and before performing the step of transmitting a unique synchronization sequence from the second electronic circuit to the first electronic circuit on the second capacitively coupled channel, sending a clock signal from the second electronic circuit to the first electronic circuit on a third capacitive channel.

Other features which are considered as characteristic for the invention are set forth in the appended claims.

Although the invention is illustrated and described herein as embodied in a method of using a capacitively coupled interface to increase the integrity of digital signals being transmitted across the interface, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 shows an inner frame that includes a unique synchronization sequence.

FIG. 4 shows two inner frames transmitted from a master to a slave.

FIG. 5 shows an inner frame transmitted from the slave to the master.

DESCRIPTION OF THE PREFERRED EMBODIMENTS

Figure 1:
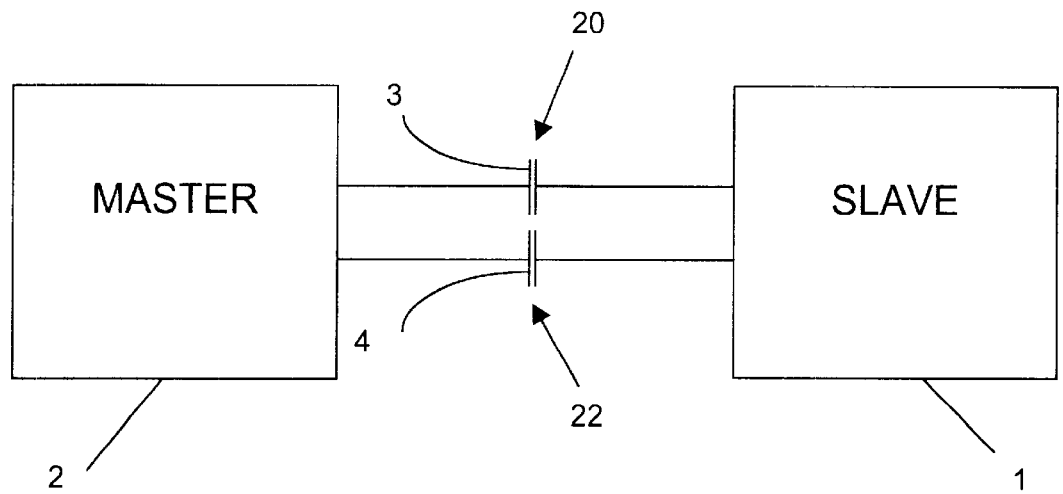
FIG. 1 shows a first embodiment of an electronic circuit that can utilize the method of the present invention.
Figure 2:
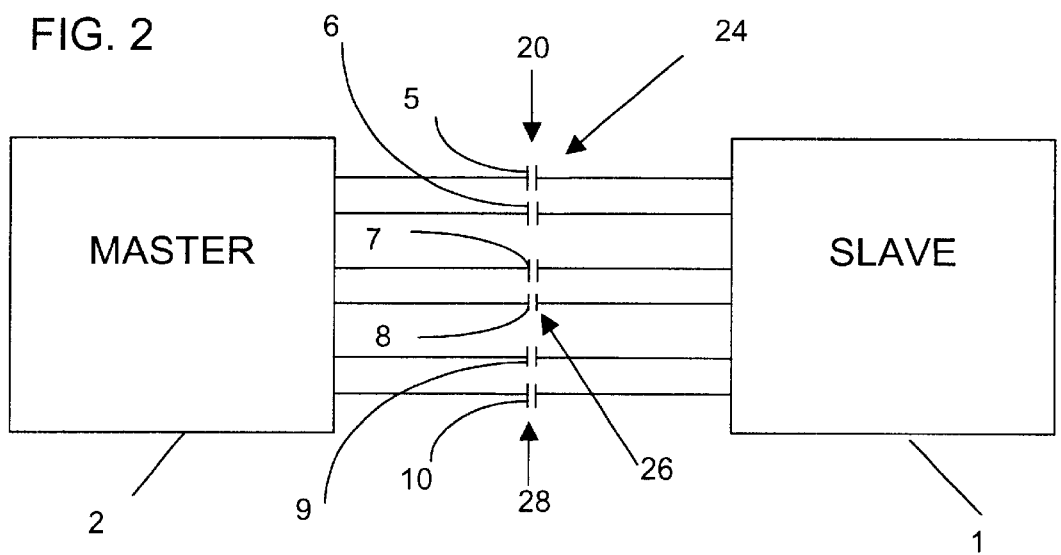
FIG. 2 shows a second embodiment of an electronic circuit that can utilize the method of the present invention.

Referring to the figures of the drawings in detail and first, particularly to FIGS. 1 and 2, there are seen two illustrative examples of circuits that can be used for implementing the method of the present invention. The ALIS V3 (Analog Line Interface Solution V3) chip set, manufactured by Siemens Semiconductor Group, is used to connect analog phone lines to digital equipment. The ALIS V3 chip set is an ideal front end for modems and fax machines because these pieces of equipment have to convert digital information into analog signals and vice versa for communication via telephone lines. The chip set includes a first electronic circuit, namely, a first integrated circuit PSB 4595 that functions as a slave 1, and a second electronic circuit, namely, a second integrated circuit PSB 4596 that functions as a master 2. When the slave 1 is activated, i.e., is in an off-hook state, it is powered from the telephone line. When the slave 1 is not activated, i.e., is in an on-hook state, it does not consume power from the telephone line. Again, it is emphasized that these integrated circuit chips are illustrated as merely one example of a circuit that can implement the method of the present invention, and the method is not to be construed as being limited to use with these chips.

It is desirable to electrically isolate the slave 1 from the master 2 and other circuitry (not shown) connected to the master 2. Because of the isolation, while the slave 1 could potentially be damaged, the master 2 and the other circuitry are protected from an electrical transient that could develop on the telephone line. The slave 1 receives power from the telephone line while the master 2 receives power from a supply that is isolated from the telephone line. It is also necessary to isolate the digital signal lines that are used for transmitting digital signals between the master 2 and the slave 1. For example, one or more capacitors 3–10, are used on each digital signal line to electrically isolate the master 2 from the slave 1 while still allowing digital signal transmission between the slave 1 and the master 2. This is known as capacitive coupling, i.e., one or more capacitors are connected is series with a digital signal line. As can be seen from FIGS. 1 and 2, a capacitive interface 20 includes at least one and preferably a plurality of capacitive channels. Referring to FIG. 1, a first exemplary embodiment can be seen wherein the capacitive interface 20 includes one capacitive channel 22. The capacitive channel 22 is preferably implemented with two digital signal lines wherein each digital signal line has at least one serially connected capacitor such as capacitors 3 and 4. The capacitive channel 22 enables differential transmission of signals. With this first exemplary embodiment all of the necessary signals are transmitted between the slave 1 and the master 2 on the single capacitive channel 22 using time division multiplexing. For example, digital signal transmission from the master 2 to the slave 1, digital signal transmission from the slave 1 to the master 2, and a clock signal can be time division multiplexed on the single capacitive channel 22. Both the master 2 and the slave 1 include latches (not shown) so that the received digital signals can be latched. The most important element is that a protective protocol be used.

Referring to FIG. 2, a second exemplary embodiment can be seen wherein the capacitive interface 20 includes a plurality of capacitive channels, preferably three. A first capacitive channel 24 allows digital signal transmission from the slave 1 to the master 2, a second capacitive channel 26 allows digital signal transmission from the master 2 to the slave 1, and a third capacitive channel 28 allows a clock signal to be transmitted from the master 2 to the slave 1. Each capacitive channel 24, 26, and 28 is preferably implemented with two digital signal lines wherein each digital signal line has at least one serially connected capacitor such as capacitors 5–10. Although not preferable, it is also possible to implement each capacitive channel 24, 26, and 28 with one digital signal line and reference each digital signal line to a common ground line that has at least one serially connected capacitor. Each capacitive channel 24, 26, and 28 enables differential transmission of digital signals. Both the master 2 and the slave 1 include latches (not shown) so that the received digital signals can be latched. As with the first exemplary embodiment, the most important element is that a protective protocol be used.

The digital signals include control bits, status information bits, and data bits. It is desirable to use a protocol that will prevent the control bits from being incorrectly read due to corruption on the capacitive interface 20 so that false programming does not occur. It is also desirable to use a protocol that will enable detection of the correct state of the slave 1, as well as enable synchronization of the slave 1 with the master 2.

During the on-hook state the slave 1 is inactive and does not draw any power from the telephone line. During this on-hook state the master 2 cannot determine whether the capacitive interface 20 or the slave 1 has become inoperative. To enter into an operative off-hook state, the slave 1 has to be properly programmed with control bits from the master 2, and the slave 1 has to send status bits to the master 2 so that the master 2 can determine the correct status of the slave.

Using the first and second exemplary embodiments to perform the method of the invention will become clear from the following discussion. With reference to the first embodiment shown in FIG. 1, in order to enter into an operative off-hook state, the slave 1 is powered from the line and sends a signal, preferably a pulse on the capacitive channel 22, to the master 2 to start the process of synchronizing the slave 1 with the master 2. After the master 2 receives the pulse, the master 2 starts the clock signal on the capacitive channel 22 and transmits a unique synchronization sequence of data and control bits to the slave 1 on the capacitive channel 22. The slave 1 recognizes the unique synchronization sequence and transmits data and status information to the master 2 on the capacitive channel 22. The master 2 then determines whether the received status information is consistent with predetermined status information, and if the received status information is consistent, the master 2 considers the received data to be valid.

With reference to the second preferred embodiment shown in FIG. 2, in order to enter into an operative off-hook state, the slave 1 is powered from the line and sends a signal to the master 2. The signal is preferably a pulse sent on the first capacitive channel 24 to the master 2 to start the process of synchronizing the slave 1 with the master 2. After the master 2 receives the pulse, the master 2 starts the clock signal on the third capacitive channel 28 and transmits a unique synchronization sequence of data and control bits to the slave 1 on the second capacitive channel 26. The slave 1 recognizes the unique synchronization sequence and transmits data and status information to the master 2 on the first capacitive channel 24. The master 2 determines whether the received status information is consistent with predetermined status information, and if the received status information is consistent, the master 2 considers the received data to be valid.

Referring to both the first and second preferred embodiments shown in FIGS. 1 and 2, respectively, a preferred synchronization sequence consists of the bits "1 1 0". With the benefit of the present disclosure, one of ordinary skill in the art will now recognize that other synchronization sequences could be utilized.

After the slave 1 has been synchronized with the master 2, the connection that has been established with the capacitive interface 20 enables the transfer of data bits and control/status bits. An important object of the invention is to protect transmission of the bits from disturbances on the capacitive interface 20. A special protocol that is transmitted always includes a mixture of logic 1's and 0's so that the capacitors 3–10 on the digital signal transmission channels 22, 24, 26, and 28 are charged and discharged. This enables the comparators in the receiver circuitry (not shown) of the master 2 and the slave 1 to reliably detect a level crossing. Codes that do not include such a special protocol present the danger that the first logic 1 after a long sequence of logic 0's, or the first logic 0 after a long sequence of logic 1's will be lost.

The frame protocol preferably consists of three levels: an inner frame preferably consisting of four bits, an outer frame preferably consisting of 64 inner frames, and a super frame preferably consisting of two outer frames.

Referring to FIG. 3, the first inner frame 30 transmitted from the master 2 to the slave 1 includes a synchronization sequence, preferably the sequence "1 1 0", and also includes a single data bit. Referring to FIG. 4, the remaining inner frames 40 transmitted from the master 2 to the slave 1 consist of a logic 0, followed by a control bit, followed by a logic 0, and finally followed by a data bit. A control bit is transmitted twice in successive inner frames. One time the control bit is preferably transmitted in a non-inverted state and the other time the control bit is preferably transmitted in an inverted state. Referring to FIG. 5, the inner frames 50 transmitted from the slave 1 to the master 2 consist of a first control bit, followed by two data bits, and finally followed by a logically inverted first control bit.

The purpose of the super frame is to prevent incorrect programming caused by disturbances with the synchronization. Two outer frames are transmitted. First, it is determined whether all of the control/status bits of the inner frames comprising one outer frame are valid. Second, it is determined whether all of the control/status bits of the inner frames comprising the second outer frame are valid. If the control/status bits of the first valid inner frame match with the corresponding control/status bits of the second valid outer frame, the control/status bits will be utilized to affect an appropriate change in operation. For example, programming information from the control bits will be sent to the appropriate hardware device, or the status bits will lead to interrupts or changes in the power state.

Since each bit is sent twice, additional data integrity can be provided by comparing the two new corresponding bits with the previous bit held in a latch in the receiver circuitry (not shown) of the master 2 and the slave 1 and making a two out of three decision to assign a new value to that bit.

We claim:

1. A method of using a capacitively coupled interface to increase the integrity of digital signals transmitted across the interface, which comprises:

transmitting a signal from a first electronic circuit to a second electronic circuit on the capacitively coupled interface;

after the second electronic circuit receives the signal from the first electronic circuit, the second electronic circuit starting a clock signal and transmitting a unique synchronization sequence of data and control bits from the second electronic circuit to the first electronic circuit on the capacitively coupled interface;

after the first electronic circuit receives the unique synchronization sequence, the first electronic circuit recognizing the unique synchronization sequence and constructing a status signal that contains information concerning a status of the first electronic circuit;

transmitting the status signal and a data signal from the first electronic circuit for reception by the second electronic circuit on the capacitively coupled interface;

the second electronic circuit determining if the received status signal corresponds to a predetermined status signal; and if the received status signal corresponds to the predetermined status signal, determining that the received data signal is valid.

2. The method according to claim 1, which comprises:

performing the step of transmitting the signal from the first electronic circuit to the second electronic circuit on a first capacitively coupled channel; and performing the step of transmitting the unique synchronization sequence from the second electronic circuit to the first electronic circuit on a second capacitively coupled channel.

3. The method according to claim 2, which comprises: after the second electronic circuit receives the signal from the first electronic circuit and before performing the step of transmitting a unique synchronization sequence from the second electronic circuit to the first electronic circuit on the second capacitively coupled channel, sending a clock signal from the second electronic circuit to the first electronic circuit on a third capacitive channel.

* * * * *